US007440601B1

(12) United States Patent
Summers et al.

(10) Patent No.: US 7,440,601 B1
(45) Date of Patent: Oct. 21, 2008

(54) AUTOMATED IDENTIFICATION OF ILEOCECAL VALVE

(75) Inventors: Ronald Summers, Potomac, MD (US); Jianhua Yao, Columbia, MD (US); C. Daniel Johnson, Rochester, MD (US)

(73) Assignees: The United States of America as represented by the Department of Health and Human Services, Washington, DC (US); Mayo Foundation for Medical Education and Research, Rochester, MN (US)

( * ) Notice: Subject to any disclaimer, the term of this patent is extended or adjusted under 35 U.S.C. 154(b) by 740 days.

(21) Appl. No.: 10/961,681

(22) Filed: Oct. 8, 2004

Related U.S. Application Data

(63) Continuation-in-part of application No. 10/779,210, filed on Feb. 13, 2004.

(60) Provisional application No. 60/510,640, filed on Oct. 10, 2003.

(51) Int. Cl.
G06K 9/00 (2006.01)
(52) U.S. Cl. .................... 382/128; 382/131; 382/132
(58) Field of Classification Search ................ 382/128, 382/131, 132; 378/5
See application file for complete search history.

(56) References Cited

U.S. PATENT DOCUMENTS

| | | | |
|---|---|---|---|
| 5,611,342 A * | 3/1997 | Widder | 600/431 |
| 6,246,784 B1 | 6/2001 | Summers et al. | |
| 6,331,116 B1 | 12/2001 | Kaufman et al. | |
| 6,343,936 B1 | 2/2002 | Kaufman et al. | |
| 6,345,112 B1 | 2/2002 | Summers et al. | |
| 7,043,064 B2 | 5/2006 | Paik et al. | |
| 7,260,250 B2 | 8/2007 | Summers et al. | |
| 2002/0097320 A1 | 7/2002 | Zalis | |
| 2004/0064029 A1 | 4/2004 | Summers et al. | |
| 2004/0101182 A1 | 5/2004 | Miller et al. | |

OTHER PUBLICATIONS

Johnson et al., CT Colonography: The Next Colon Screening Examination?, 2000, Radiology, pp. 331-341.*
U.S. Appl. No. 10/779,210, filed Feb. 13, 2004, Summers et al.
"Attenuation Number," http://www.amershamhealth.com/medcyclopaedia/medical/Query.asp?CiResultsSize=on&CiResultsSize=on&advancedsearch=true&SearchString=Attenuation+Number&searchimage.x=39&searchimage.y=15, 1 page, website visited on Dec. 12, 2003.
"FAQ: Fuzzy Logic and Fuzzy Expert Systems 1/1" http://www.faqs.org/faqs/fuzzy-logic/part1/, 38 pages, website visited on Feb. 9, 2004.
"Hounsfield Unit," http://www.amershamhealth.com/medcyclopaedia/medical/Query.asp?CiResultsSize=on&CiResultsSize=on&advancedsearch=true&SearchString=Hounsfield=unit, 1 page, webiste visited on Dec. 12, 2003.

(Continued)

*Primary Examiner*—Bhavesh Mehta
*Assistant Examiner*—John B Strege
(74) *Attorney, Agent, or Firm*—Klarquist Sparkman, LLP

(57) ABSTRACT

Portions of a virtual colon can be analyzed to identify a normal structure, such as an ileocecal valve. Paradigmatic characteristics of ileocecal valves can be used to identify a digital representation as an ileocecal valve. Upon determination that a digital representation has the characteristics of an ileocecal valve, action can be taken. For example, the digital representation can be removed from a list of polyp candidates.

41 Claims, 10 Drawing Sheets

OTHER PUBLICATIONS

"Iso-Surface Rendering," available at http://www.cs.sunysb.edu/~meuller/teaching/cse564/isosurface.pdf, 13 pages, website visited on Feb. 2, 2004.

Fishman et al., "3D Imaging: Principles and Techniques," Inside InSpace, http://www.insideinspace.com/article3.html, 17 pages, website visited on Feb. 2, 2004.

Cohen, "Note On Active Contour Models and Balloons," *Computer Vision, Graphics, and Image Processing (CVGIP): Image Understand*, vol. 53, No. 2, pp. 211-218, Mar. 1991.

Dachman et al., "Sources of false positives in computerized detection of polys in CT colonography," *Radiology* 225(P):303-304, 2002. (abstract).

El-Amin et al., "Ileocecal valve: spectrum of normal findings at double-contrast barium enema examination," *Radiology* 227(1):52-8, 2003; Epub Feb. 19, 2003.

Fultz et al., "Differential diagnosis of fat-containing lesions with abdominal and pelvic CT," *RadioGraphics* 13:1265-1280, 1993.

Hara et al., "Reducing data size and radiation dose for CT colonography," *Am. J. Roentgenol.* 168:1181-1184, 1997.

Iordanescu et al., "Rectal Tube Detection in CTCCAD," Radiological Society of North America, Scientific Assembly and Annual Meeting Program, Abstract No. 692, Cover and 1 page, Dec. 2, 2003.

Jerebko et al., "Computer-aided Polyp Detection in CT Colonography Using an Ensemble of Support Vector Machines," *International Congress Series 1256*, pp. 1019-1024, Jun. 27, 2003.

Jerebko et al., "Multiple neural network classification scheme for detection of colonic polyps in CT colonography data sets," *Acad. Radiol.* 10(2):154-60, 2003.

Jerebko et al., "Polyp Segmentation Method for CT Colonography Computer Aided Detection," *Medical Imaging 2003: Physiology and Function: Methods, Systems, and Applications, in Proceedings of the SPIE*, vol. 5031, pp. 359-369, May 2003.

Jerebko et al., "Radon Transform Based Polyp Segmentation Method for CT Colonography Computer Aided Diagnosis," Radiological Society of North America, Abstract No. 100, pp. 257-258, 2002.

Jerebko et al., "3D Automatic Colonic Polyp Segmentation Method for CT Colonography," Radiological Society of North America, Scientific Assembly and Annual Meeting Program, Abstract No. 691, Cover and 1 page, Dec. 2, 2003.

Kass et al., "Snakes: Active Contour Models," *International Journal of Computer Vision*, pp. 321-331, 1988.

Malley et al., "Variance reduction for error estimation when classifying colon polys from CT Colonography," *Medical Imaging 2003: Physiology and Function: Methods, Systems, and Applications*, Anne V. Clough, Amir A. Amini, Editors, *Proceedings of SPIE* vol. 5031:570-578, 2003.

Masubuchi et al., "The significance of microsatellite instability in predicting the development of metachronous multiple colorectal carcinomas in patients with nonfamilial colorectal carcinoma," *Cancer* 85(9):1917-24, 1999. (abstract).

Miller et al., "Feature selection for computer-aided polyp detection using genetic algorithms," *Medical Imaging 2003: Physiology and Function: Methods, Systems, and Applications*, Anne V. Clough, Amir A. Amini, Editors, *Proceedings of SPIE*, vol. 5031:102-110, 2003.

Na et al., "Automated detection of polyps from multi-slice CT images using 3D morphologic matching algorithm: phantom study," *Medical Imaging 2003: Image Processing*, Milan Sonka, J. Michael Fitzpatrick, eds., *Proceedings of SPIE*, 5032:877-881, 2003.

Näppi et al., "Automated Detection of Polyps with CT Colonography: Evaluation of Volumetric Features for Reduction of False-Positive Findings," *Academic Radiology*, vol. 9, No. 4, pp. 386-397, 2002.

Näppi et al., "Computer-aided detection of polyps in CT colonography: effect of feature-guided polyp segmentation method," *Radiology* 225(P), Nov. 2002.

Näppi et al., "Computerized detection of colorectal masses in CT colonography based on fuzzy merging and wall-thickening analysis," *Med. Phys.* 31(4):860-872, Apr. 2004.

Näppi et al., "Optimization of the Ranking of Computer-Detected Polyp Candidates in CT Colonography," Radiological Society of North America, Scientific Assembly and Annual Meeting Program, Abstract No. 690, Cover and 1 page, Dec. 2, 2003.

Okamoto et al., "Significance of microsatellite instability in different types of early-stage nonfamilial colorectal carcinomas," *Dis. Colon Rectum* 41:1385-1391, 1998.

Pham et al., "An Adaptive Fuzzy C-Means Algorithm for Image Segmentation in the Presence of Intensity Inhomogeneities," *Pattern Recognition Letters*, vol. 20, 15 pages, 1998.

Pickhardt, et al., "Computed Tomographic Virtual Colonoscopy to Screen for Colorectal Neoplasia in Asymptomatic Adults," *The New England Journal of Medicine*, vol. 349, No. 23, pp. 2191-2200, Dec. 1, 2003.

Saff et al., "Distributing Many Points on a Sphere," *The Mathematical Intelligencer*, vol. 19, No. 1, pp. 5-11, 1997.

Serlie et al., "A Probabilistic Method for Virtual Colonoscopy Cleansing," *Medical Imaging 2003: Physiology and Function: Methods, Systems, and Applications, in Proceedings of the SPIE*, vol. 5031, pp. 405-412, Feb. 2003.

Summers et al., "An integrated system for computer-aided diagnosis in CT colonography: work-in-progress," *CARS*, Lemke et al., eds., Presented at the 15th International Congress and Exhibition, Berlin, Germany, Jun. 27-30, 2001.

Summers et al., "Automated Polyp Detection at CT Colonography: Feasibility Assessment in a Human Population," *Radiology*, vol. 219, No. 1, pp. 51-59, 2001.

Summers et al., "Automated polyp detector for CT colonography: feasibility study," *Radiology* 216:284-290, 2000.

Summers, "Challenges for Computer-aided Diagnosis for CT Colonography," *Abdominal Imaging*, vol. 27, pp. 268-274, 2002.

Summers et al., "Colonic Polyps: Complementary Role of Computer-aided Detection on CT Colonography," *Radiology*, Radiological Society of North America, vol. 225, pp. 391-399, 2002.

Summers, "Navigational aids for real-time virtual bronchoscopy," *AJR* 168:1165-1170, 1997.

Summers et al., "CT colonography with computer-aided detection: automated recognition of ileocecal valve to reduce number of false-positive detections," *Radiology* 233(1):266-272, 2004.

Summers, "Current Concepts and Future Directions in Computer-aided Diganosis for CT Colonography," *CARS*, 6 pages, 2002.

Summers and Yoshida, Future directions: computer-aided diagnosis. In: Dachman, ed. *Atlas of virtual colonoscopy*, New York, NY: Springer, 55-62, 2003.

Summers, "Image gallery: a tool for rapid endobronchial lesion detection and display using virtual bronchoscopy," *Journal of Digital Imaging* 11(3) Suppl. 1:53-55, 1998.

Summers et al., "Virtual bronchoscopy: Segmentation method for real-time display," *Radiology* 200:857-862, 1996.

Tawfik et al., "Lipohyperplasia of the Ileocecal Valve," *The American Journal of Gastroenterology* 87(1):82-87, 1992.

Thibodeau et al., "Microsatellite instability in cancer of the proximal colon," *Science* 260(5109):816-819, 1993.

Thirion et al., "Computing the Differential Characteristics of Isointensity Surfaces," *Computer Vision and Image Understanding*, vol. 61, No. 2, pp. 190-202, Mar. 1995.

Wang et al., "Skeleton based 3D computer aided detection of colonic polyps," *Medical Imaging 2003: Image Processing*, Milan Sonka, J. Michael Fitzpatrick, eds., *Proceedings of SPIE*, 5032:843-853, 2003.

Xu et al., "Chapter 3: Image Segmentation Using Deformable Models," in *Handbook of Medical Imaging, vol. 2, Medical Image Processing and Analysis*, M. Sonka and J.M. Fitzpatrick, Editors, SPIE, pp. 129-174, 2000.

Xu et al., "Finding the Brain Cortex Using Fuzzy Segmentation, Isosurfaces, and Deformable Surface Models," in *The XVth Int. Conf. on Info. Proc. in Med. Img (IPMI)*, pp. 399-404, Jun. 2002.

Yao et al., "Automatic Segmentation of Colonic Polyps in CT Colonography Based on Knowledge-Guided Deformable Models," *Medical Imaging 2003: Physiology and Function: Methods, Systems, and Applications, in Proceedings of the SPIE*, vol. 5031, pp. 370-380, Feb. 2003.

Yao and Summers, "3D colonic polyp segmentation using dynamic deformable surfaces," *Medical Imaging 2004: Physiology, Function, and Structure from Medical Images*, edited by Amir A. Amini, Armando Manduca, *Proceedings of SPIE* 5369:280-289, 2004.

Yoshida et al., "Computer-Aided Diganosis Scheme for Detection of Polyps at CT Colonography," *RadioGraphics*, vol. 22, No. 4, pp. 963-979, Jul.-Aug. 2002.

Yoshida et al., "Computerized Detection of Colonic Polyps on the Basis of Volumetric Features: Pilot Study," *Radiology*, vol. 222, No. 2, pp. 327-336, 2002.

Yoshida, "Three-Dimensional Computer-Aided Diagnosis Scheme for Detection of Colonic Polyps," *IEEE Transactions on Medical Imaging*, vol. 20, No. 12, Dec. 2001, 14 pages.

* cited by examiner

712

722

732

812

822

832

912

922

932

AUTOMATED IDENTIFICATION OF ILEOCECAL VALVE

CROSS-REFERENCE TO RELATED APPLICATIONS

This application claims the benefit of Summers et al., U.S. Provisional Patent Application No. 60/510,640, entitled, "AUTOMATED IDENTIFICATION OF ILEOCECAL VALVE," filed Oct. 10, 2003, which is hereby incorporated by reference herein. This application is a continuation-in-part of Summers et al., U.S. patent application Ser. No. 10/779,210, entitled, "DETERMINATION OF FEATURE BOUNDARIES IN A DIGITAL REPRESENTATION OF AN ANATOMICAL STRUCTURE," filed Feb. 13, 2004.

FIELD

The field relates to automated analysis of digital representations of anatomical structures.

BACKGROUND

Technology for non-invasive observation of soft tissues of the body has provided significant advances in the field of medicine. For example, a number of techniques now make it possible to routinely image anatomical structures such as the heart, colon, bronchus, and esophagus within the body.

The widespread availability of skilled technicians and reduction in cost of the necessary equipment has encouraged the use of non-invasive imaging as a part of routine preventive care. Non-invasive imaging reduces the risk of observation-related injury or complication and reduces discomfort and inconvenience for the observed patient. These advantages encourage patients to undergo more frequent screening and permits earlier detection of potentially life-threatening conditions. For example, malignant or premalignant conditions can be identified and diagnosed at an early stage, when treatment is more likely to be successful.

In one commonly used imaging technique called Computed Tomography Imaging ("CT Scan"), multiple two-dimensional radiographic image cross-sections are taken of a particular region of the patient's body. A physician can then analyze the sectioned images to detect any anomalies within the observed section and judge which anomalies are of interest, requiring further attention or treatment.

To assure adequate coverage of the section being observed, a large number of cross-sectional slices can be obtained to increase the observation resolution. However, as the number of slices increases, the amount of data presented to the physician becomes more difficult to efficiently analyze. Accordingly, various software techniques have been applied with some success to aid in analyzing the data to identify anomalies.

Although progress has been made in employing software to assist in detection of anatomical anomalies, there are significant limitations to the current automated techniques. For example, one problem consistently plaguing such systems is the overabundance of false positives.

Typically, the software approach correctly identifies anomalies of interest (i.e., the software exhibits superior sensitivity). However, the software also tends to incorrectly identify too many structures as anomalies of interest (i.e., the software exhibits poor specificity). A feature incorrectly identified as an anomaly of interest is called a "false positive."

False positives are troublesome because any identified positives must be considered and evaluated by a human classifier (such as the physician or a technician). Even if an anomaly can be quickly dismissed as a false positive, too many false positives consume an inordinate amount of time and limit the usefulness of the software-based approach.

A particular example of a common problem with automated CT analysis is the misidentification of the ileocecal valve (QCV) as a polyp during CT colonography. Because the ileocecal valve exhibits the characteristics of a polyp (for example, it has the morphology of a large polyp), it is likely to be detected by software as a polyp and presented as an anomaly of interest.

There thus remains a need for a way to improve the computer-based approaches for identifying anomalies of interest in anatomical structures. For example, specificity can be improved by developing techniques which identify potential pathologies while reducing misclassification of normal structures as features of interest.

SUMMARY

Embodiments described herein include methods and systems for analyzing a digital representation of an anatomical structure such as a virtual colon to identify normal structures, such as an ileocecal valve. For example, in a scenario in which a list of polyp candidates is analyzed, the ileocecal valve can be removed from the list. Because the ileocecal valve is a normal structure and not a polyp (i.e., it is a false positive), removing the ileocecal valve from the list of polyp candidates increases the usefulness (for example, specificity) of computer aided polyp detection techniques.

Characteristics of a digital representation of at least a portion of a colon can be compared with paradigmatic characteristics of digital representations of ileocecal valves. Based on determining that the digital representation has the characteristics of an ileocecal valve, action can be taken.

For example, the digital representation can be removed from a list of polyp candidates or depicted distinctively in a visual depiction. Characteristics can include density, volume, intensity, attenuation, location within the colon, and the like.

Additional features and advantages of the technologies described herein will be made apparent from the following detailed description of illustrated embodiments, which proceeds with reference to the accompanying drawings.

DETAILED DESCRIPTION

Overview of Technologies

The technologies described herein can be used in any of a variety of scenarios in which identification of normal structures is useful. For example, when performing computer-aided detection of polyps in a CT scan of the colon, identifying the ileocecal valve can be useful in that it reduces the number of false positives to be reviewed when reviewing the CT scan data (for example, in a graphical depiction of the CT scan data).

A digital representation includes any digital representation of an anatomical structure (or portion thereof) stored for processing in a digital computer. For example, representations can include two- or three-dimensional representations of portions of an anatomical structure stored as images via a variety of data structures. Representations can be composed of pixels, voxels, or other elements. A digital representation of an anatomical structure is sometimes called "virtual" (for example, a "virtual colon") because it is a digital representation that can be analyzed to learn about the represented anatomical structure.

Imaging includes any techniques for obtaining an image of the inside of a body by transmitting electromagnetic or sonic waves through the body. Imaging includes radiographic images (with X-rays, for example CT), sonic energy (such as ultrasound) and magnetic fields (such as MRI).

After imaging is performed, automated detection of polyps can result in a list of polyp candidates. Various characteristics of the polyp candidates (for example volume and density) can be evaluated to determine whether the polyp candidate is an ileocecal valve. If a polyp candidate is identified as an ileocecal valve, it can be acted upon accordingly (such as being removed from the list of polyp candidates). The fat content, anatomic location, and volume characteristics of the ileocecal valve have been found by the inventors to be useful because they have found that the ileocecal valve exhibits different such characteristics from the surrounding tissue.

It is important that the polyps be detected because they are often premalignant and are often prophylactically removed to avoid development of gastrointestinal adenocarcinoma. Thus, early detection enables early treatment (such as removal of the polyp) of possibly life-threatening conditions.

EXAMPLE 1

Exemplary System for Processing Digital Representation

Figure 1:
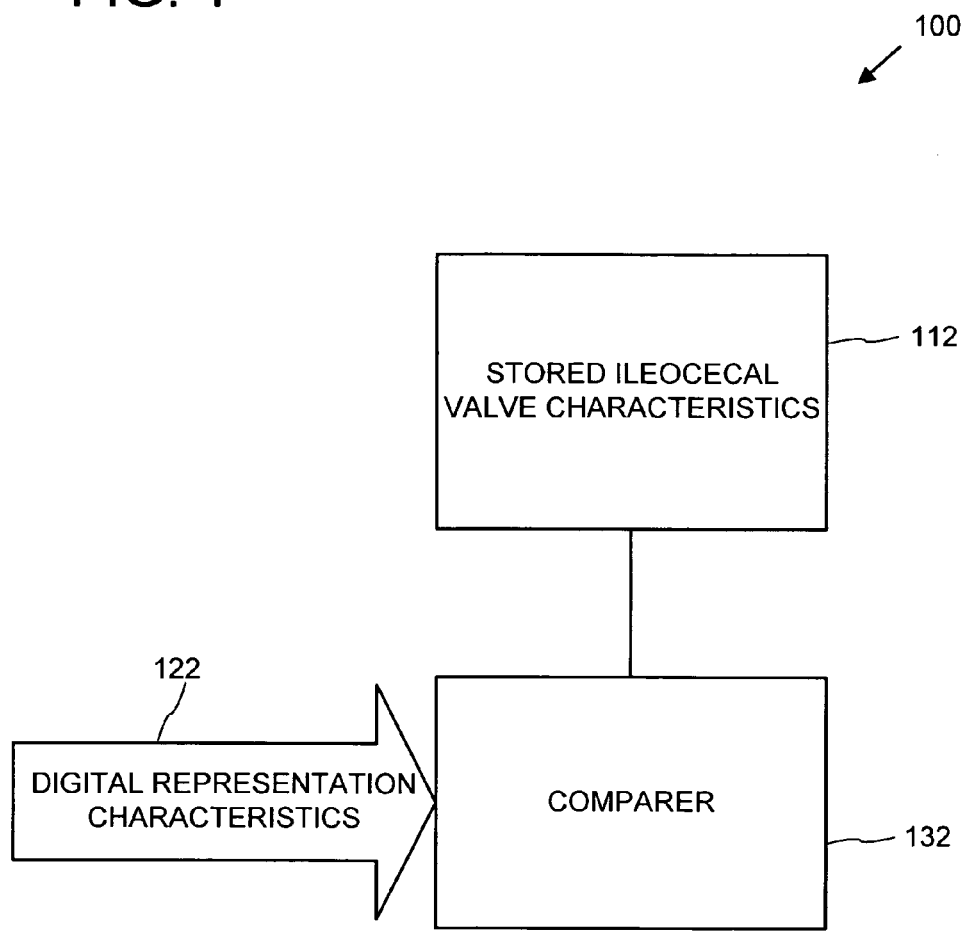
FIG. 1 is a block diagram of an exemplary system for processing a digital representation of at least a portion of a colon.

FIG. 1 shows an exemplary system 100 for processing a digital representation of at least a portion of a colon. The system 100 can take action based on whether characteristics of the digital representation comprise those of an ileocecal valve.

In the system 100, one or more stored ileocecal valve characteristics 112 represent one or more paradigmatic characteristics of digital representations of ileocecal valves (for example, based on empirical observation of ileocecal valves in digital representations). The paradigmatic characteristics 112 can take the form of one or more thresholds and can be generated, for example, by determining thresholds that satisfy desired criteria (for example, to identify an ileocecal valve without misidentifying a polyp as an ileocecal valve).

The system 100 is operable to access one or more characteristics 122 of a digital representation of at least a portion of a colon. The characteristics 122 of the digital representation are associated with or included in the representation 122. The digital representation associated with the characteristics 122 can take many forms, including boundaries for the polyp candidates, and can be produced as part of a list of polyp candidates. The characteristics 122 of the digital representation can be stored by other software in a way that it is accessible by the system 100.

A comparer 132 is operable to compare the stored ileocecal valve characteristics 112 with the characteristics 122 of the digital representation and can indicate whether the characteristics 122 of the digital representation meet the thresholds (for example, compare favorably with the paradigmatic characteristics 112).

Further software (not shown) can take action based on the results of the comparer 132.

EXAMPLE 2

Exemplary Method for Processing Digital Representation

Figure 2:
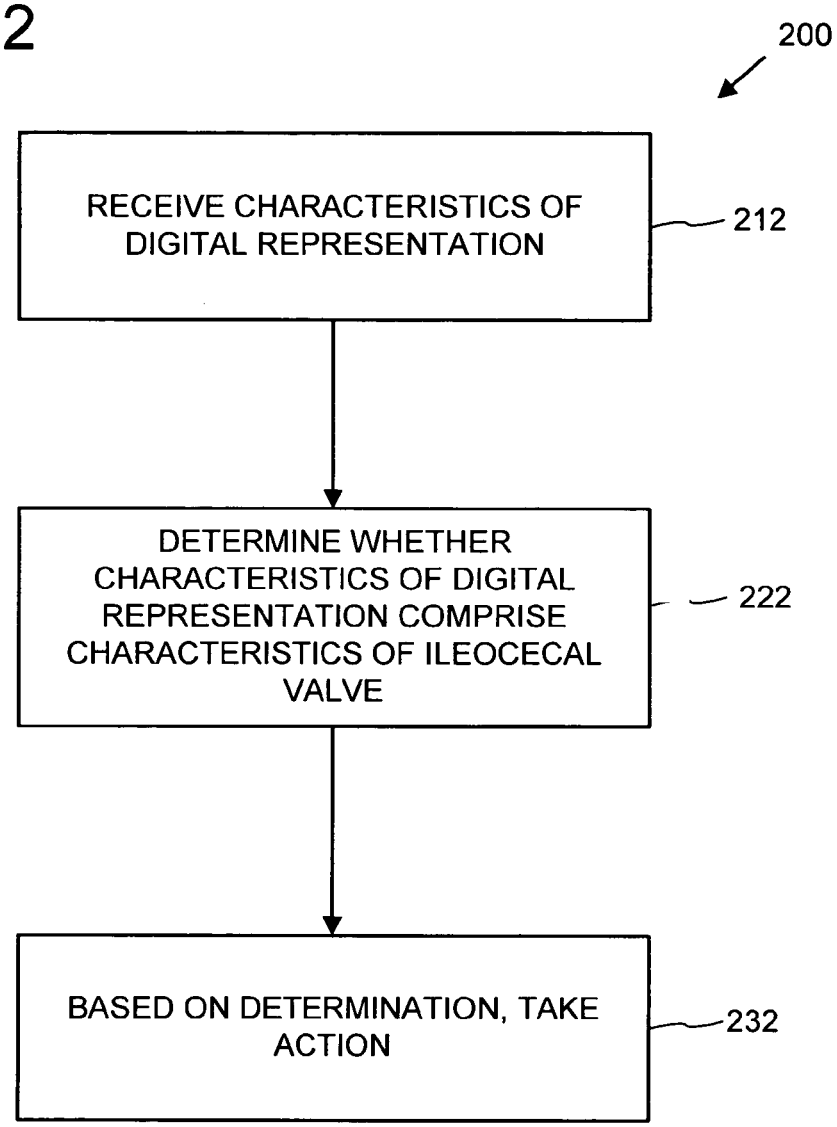
FIG. 2 is a flowchart showing an exemplary method for processing a digital representation of at least a portion of a colon.

FIG. 2 shows an exemplary method 200 for processing a digital representation (for example, the digital representation having the characteristics 122 of FIG. 1) of at least a portion of a colon. The method can be carried out by a system such as the system 100 of FIG. 1. At 212, characteristics (for example, the characteristics 122 of FIG. 1) of the digital representation of at least a portion of the colon are received.

At 222, it is determined (for example, a determination is made) whether the characteristics of the digital representation comprise characteristics of an ileocecal valve (for example, the stored characteristics 112 of FIG. 1).

At 232, action with respect to the digital representation is taken based on the determination of 222.

Although some examples show processing a single digital representation, in practice, plural digital representations can be processed (for example, plural portions of the colon of a human subject identified as polyp candidates) by any of the examples described herein.

EXAMPLE 3

Exemplary Actions

The action taken with respect to the digital representation (for example, by the system 100 of FIG. 1 or by the method 200 of FIG. 2) can include any software processing appropriate for having identified the digital representation as an ileocecal valve. For example, if the digital representation has been included in a list of polyp candidates, the digital representation can be removed from the list (e.g., declassified as a polyp candidate) or otherwise designated as a non-polyp. Or, the action can affect the ranking of polyp candidates ranked according to a scoring system.

In a scenario in which the virtual colon is depicted visually, the action can include depicting the digital representation distinctively (for example, via a distinctive color or an outline) in the visual presentation.

EXAMPLE 4

Exemplary Characteristics

The characteristics used by the technologies described herein (for example, the paradigmatic characteristics 122 of FIG. 1) can include any number of characteristics usable to distinguish an ileocecal valve. For example, density, volume, intensity (for example, MRI intensity), attenuation (for example, CT attenuation), location within the colon, and the like can be used. Appropriate thresholds or other mechanisms for the characteristics can be stored for comparison against those of digital representations.

Any combination of a plurality of the characteristics can be used. For example, volume and density can be used together to identify a digital representation having characteristics of an ileocecal valve. In some cases, the characteristics are called "features" (for example, for input to a classifier that classifies the digital representation as a polyp candidate).

EXAMPLE 5

Exemplary Measurement of Characteristics

The characteristics used by the technologies described herein (for example, the characteristics 122) can be measured in a variety of ways. For example, in CT colonography, voxels can be used to determine the volume in cubic centimeters ("cc's"), and density can be computed as a measure of CT attenuation in Hounsfield units (HU). In an MRI or ultrasound scenario, signal intensity can be used.

The attenuation and intensity can be determined by a variety of automated techniques. For example, the entire segmented area of the digital representation can be used to compute average attenuation or intensity. Another method is to determine the interior of the boundaries and computing an attenuation or intensity that does not include the boundary. The difference between these two methods is that when the boundary is included, the fuzzy edges of the boundary may affect the accuracy of the measurement. For example, in CT colonography the edges of the boundaries are sometimes fuzzy because the boundary is defined as midway between the colonic wall and lumen air.

EXAMPLE 6

Exemplary System for Processing List of Segmented Portions of Virtual Colon

Figure 3:
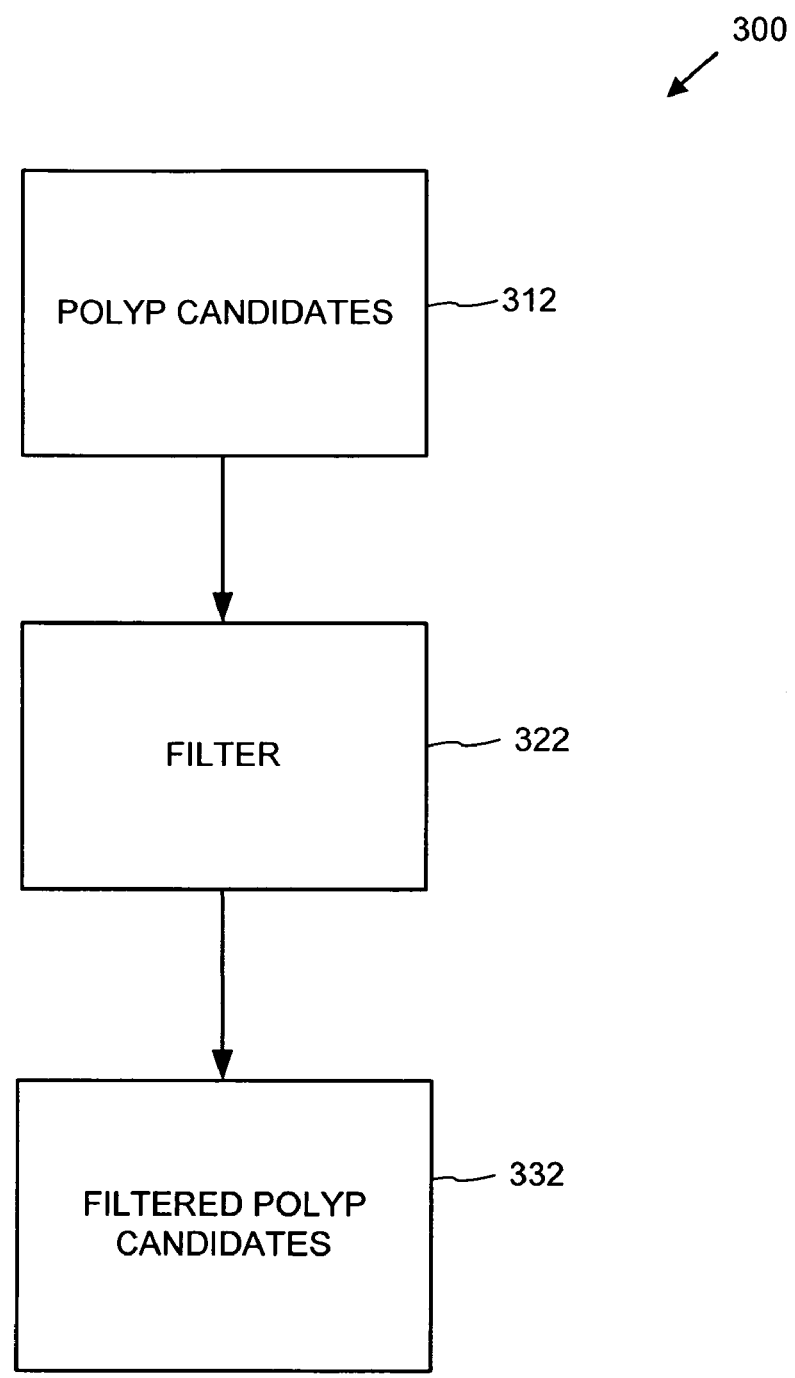
FIG. 3 is a block diagram of an exemplary system for applying the technologies in a scenario involving a list of segmented portions of a virtual colon.

FIG. 3 shows an exemplary system 300 for processing a list of segmented portions of a colon. The polyp candidates 312 can be those segmented portions of a virtual colon identified by a segmenter. The polyp candidates 312 can take the form of a list. For example, the segmented portions can be those identified within a virtual colon as polyp candidates. The list can include characteristics and locations of the segmented portions.

The filter 322 is operable to determine whether the polyp candidates 312 have characteristics of an ileocecal valve. For example, the portions can be processed by the system of FIG. 1 or the method of FIG. 2.

The filter 322 can then output the filtered polyp candidates 332 (for example, those polyp candidates not determined to have characteristics of an ileocecal valve). Although shown as separate items, in practice the candidates 312 and the filtered candidates 332 may be the same list. Those candidates that have been filtered (for example, removed from the list) can be associated with an indicator that they are identified as an ileocecal valve or otherwise filtered (for example, designated as not being polyp candidates).

EXAMPLE 7

Exemplary Method Applied to List of Segmented Portions of Virtual Colon

Figure 4:
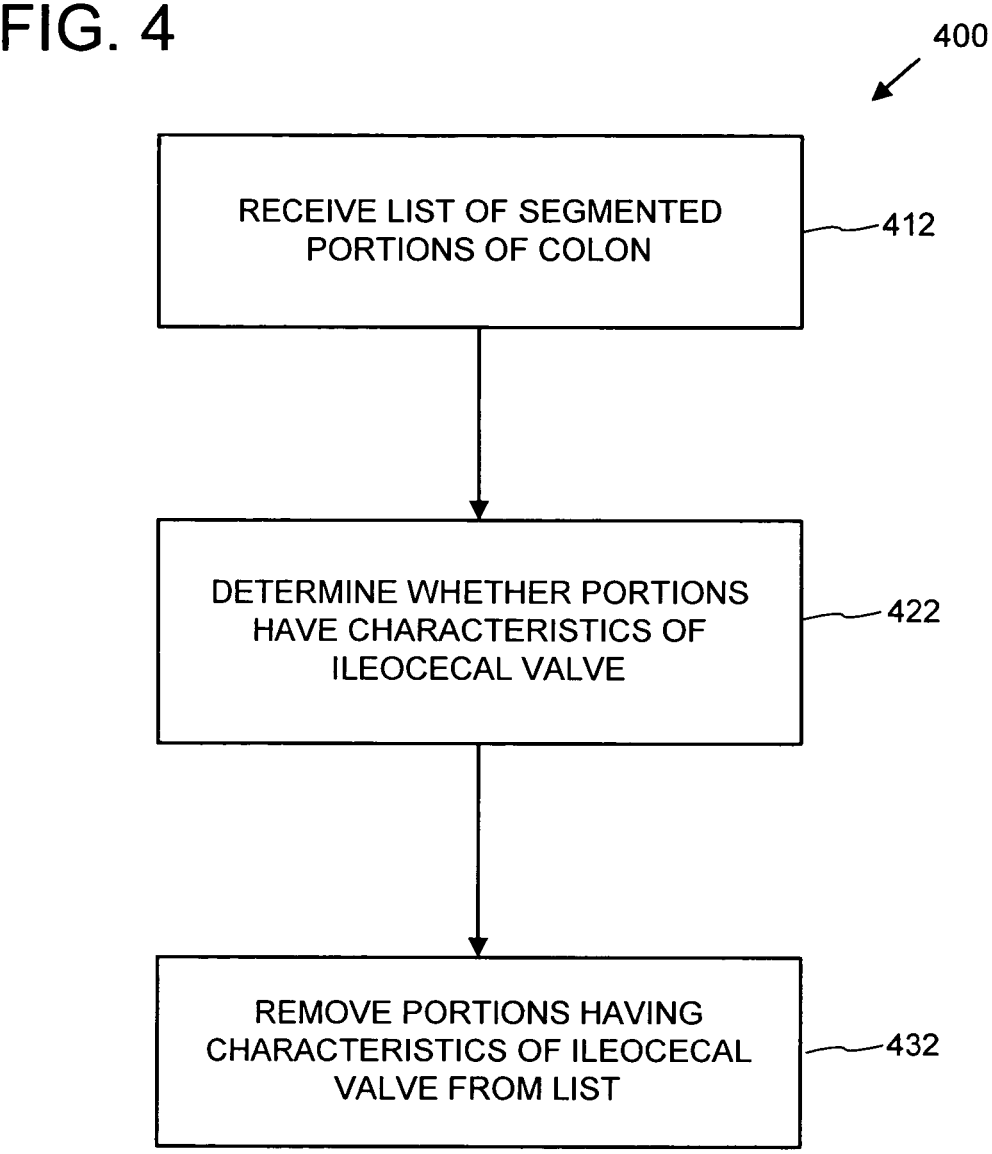
FIG. 4 is a flowchart showing an exemplary method for applying the technologies in a scenario involving a list of segmented portions of a virtual colon.

FIG. 4 shows an exemplary method for applying the technologies described herein in a scenario involving a list of segmented portions of a colon. For example, a segmenter can process a digital representation of a colon to generate a list of segmented portions of a colon that represents polyp candidates (for example, the polyp candidates 312 of FIG. 3).

At 412, a list of segmented portions of the colon (for example, the polyp candidates 312 of FIG. 3) is received.

At 422, it is determined whether the portions have characteristics of an ileocecal valve. For example, the portions can be processed by the method of FIG. 2 or the system of FIG. 1.

At 432, those portions having characteristics of an ileocecal valve are removed from the list. For example, the techniques described for the filtered polyp candidates 332 of FIG. 3 can be employed.

EXAMPLE 8

Exemplary Acquisition of Digital Representations

A variety of techniques can be used to acquire digital representations for use with the technologies described herein. In practice, a digital representation of an anatomical structure can be acquired; plural digital representations of portions of the anatomical structure can then be extracted therefrom.

Acquisition of a representation of an anatomical structure is typically done by performing a scan of the soft tissues of the patient. For example, a CT scan can be performed according to any number of standard protocols. CT scans can be used to generate thin-section CR data (for example, helical scan CT data). The representation can be analyzed immediately after the scan, or the representation can be stored for later retrieval and analysis. Exemplary techniques for acquiring scans are described in Vining et al., "Virtual Colonoscopy," *Radiology* 193(P):446 (1994), Vining et al., "Virtual Bronchoscopy," *Radiology* 193(P):261 (1994), and Vining et al., "Virtual bronchoscopy. Relationships of virtual reality endobronchial simulations to actual bronchoscopic findings" *Chest* 109(2):549-553 (February 1996), all of which are hereby incorporated herein by reference.

Any number of hardware implementations can be used to acquire a representation of an anatomical structure. For example, the GE HiSpeed Advantage scanner of GE Medical Systems, Milwaukee, Wis. can be used.

U.S. patent application Ser. No. 10/671,749, entitled "COMPUTER-AIDED CLASSIFICATION OF ANOMALIES IN ANATOMICAL STRUCTURES" by Summers et al., filed Sep. 26, 2003, describes various techniques and is hereby incorporated by reference herein.

Summers I also describes various techniques by which a representation of an anatomical structure such as the colon can be segmented to identify a list of polyp candidates (for example, anomalies of interest). For the list of digital representations of at least a portion of the colon (for example, the list of polyp candidates), characteristics of the digital representations can be determined via the techniques described in Summers I. The characteristics of the digital representations can then be analyzed via any of the technologies described herein.

Segmentation and characteristic determination can also performed via the techniques described in U.S. Provisional Patent Application No. 60/343,975 filed Dec. 27, 2001, also filed as PCT Patent Application No. PCT/US02/40641 on Dec. 18, 2002, entitled "AUTOMATED CENTERLINE DETECTION ALGORITHM FOR COLON-LIKE 3D SURFACES," by Iordenescu et al., filed Dec. 18, 2002, published as WO03058553 A, which is hereby incorporated by reference herein.

Further techniques are described in Yao et al., "Automatic Segmentation of Colonic Polyps in CT Colonography Based on Knowledge-Guided Deformable Models," *Medical Imaging* 2003, Proceedings of SPIE, 5031: 370-380, which is hereby incorporated by reference herein.

Techniques for classifying a portion as a polyp candidate include analyzing neck characteristics, wall thickness, template matching, and the like. Any other approach capable of detecting anomalies in a representation of an anatomical structure can be used as an alternative.

Although images for segmentation can be acquired via Computed Tomography Imaging ("CT scan") technology, Magnetic Resonance Imaging ("MRI") or other technology can be used.

EXAMPLE 9

Exemplary Normal Structures

The technologies described herein can be used for identification of normal structures other than the ileocecal valve and in anatomical structures other than the colon (for example, bronchus, blood vessels, bladder, urinary tract, billiary tract, cerebrospinal spinal fluid containing spaces of the brain, paranasal sinuses, chambers of the heart, and the like). Action taken for a polyp candidate identified as a normal structure can include designating the digital representation of the polyp candidate as "normal."

EXAMPLE 10

Exemplary Use of Results

The results of any of the technologies described herein can be presented in a variety of ways. For example, the results can be presented visually, such that polyp candidates are shown for consideration by a human reviewer, who determines whether the polyp candidate requires further investigation (for example, is a polyp or likely to be a polyp). In the case of a digital representation identified as an ileocecal valve, the digital representation can be omitted from presentation or presented distinctively. In this way, the number of false positives to be reviewed can be reduced.

EXAMPLE 11

Exemplary Timing of Technique

The technologies described herein can be applied to analyze digital representations already classified as polyp candidates by some other technique or applied before the other technique as desired.

EXAMPLE 12

Exemplary Digital Representations

An exemplary digital representation of at least a portion of an anatomical structure can take a variety of forms. For example, a polyp candidate can be represented by a set of voxels. The voxels and other information can be analyzed to determine the characteristics of the digital representation. The voxels can be determined via segmentation.

EXAMPLE 13

Exemplary Identification of Non-Ileocecal Valve Polyp Candidates

Although a digital representation of a polyp candidate may have the characteristics of an ileocecal valve, it may instead be some other structure (for example, a lipoma). In some cases, processing the other structure as an ileocecal valve is desirable (for example, the other structure is not malignant and not desired to be reviewed). Location information (for example, location within the colon) can be further employed to differentiate those structures that are true ileocecal valves.

EXAMPLE 14

Exemplary Techniques for Determining Boundaries

Boundaries of candidates can include any definition of a surface that encloses the candidate and its interior voxels. For example, on a 2D transverse slice, it is a closed polygon (contour) representing the boundaries of the polyp. Boundaries can also be defined for 3D scenarios.

A segmentation algorithm can process candidate anomalies of interest determined by a surface based filter and obtain a sub-image centered at the candidate seed of each candidate. First, a knowledge-guided intensity adjustment procedure can be conducted to enhance the potential candidate region. For example, in CT colonography two pieces of knowledge are used; the polyp abuts the lumen air and the polyp-lumen boundary tends to have convex curvature. Exemplary segmentation techniques are described in U.S. Pat. No. 6,556,696 to Summers et al., filed Feb. 5, 2002, entitled, "METHOD FOR SEGMENTING MEDICAL IMAGES AND DETECTING SURFACE ANOMALIES IN ANATOMICAL STRUCTURES," which is hereby incorporated herein by reference.

Second, a fuzzy c-mean clustering (fuzzy segmentation) is applied to compute membership values of voxels in the sub-image in order to classify pixels in the image to get an approximate region of the candidate. For example, in CT colonography the membership values of lumen, polyp tissue, and non-polyp tissue can be computed for each voxel.

Third, an initial deformable model can be placed in the centroid of the initial region of the candidate. The deformable model (hard segmentation) is then driven by the image force computed from the membership map of candidate tissues, together with an external balloon force and the intrinsic model force. After several iterations, the deformable model converges to a potential candidate boundary. For example, in CT colonography the membership map of polyp tissues can be used to generate the image force in the deformable model. Once the segmentation (a closed contour) is generated on one slice, the procedure is propagated to neighboring slices.

The process can be iterated until no segmentation can be found or the segmentations on adjacent slices are not continuous (the overlap is too small). At the end, 2D segmentation can be stacked up to build 3D segmentation. Exemplary 2D segmentation techniques using 2D segmentation stacked up to build 3D segmentation are described in Summers et al., U.S. patent application Ser. No. 10/779,210, entitled, "DETERMINATION OF FEATURE BOUNDARIES IN A DIGITAL REPRESENTATION OF AN ANATOMICAL STRUCTURE," filed Feb. 13, 2004, wherein such 2D segmentation techniques are hereby incorporated herein by reference.

For example, in CT colonography the final result of this process can be a determination of the 3D boundaries of candidates. Once determined, the boundaries can be used to calculate a variety of boundary-based characteristics (for example, boundary-based density, boundary-based volume, and the like).

EXAMPLE 15

Exemplary Techniques for Determining Whether Characteristics of Digital Representation Comprise Characteristics of Ileocecal Valve A variety of techniques can be used to determine whether the characteristics of a digital representation of at least a portion of the colon comprise characteristics of an ileocecal valve. For example, average density and total volume thresholds can be established for the ileocecal valve.

The digital representation can be scored via the established characteristics thresholds. For example, a test can be made to see if the characteristics of the digital representation meet (for example, are sufficiently outside or inside) the established thresholds for the ileocecal valve. In a CT colonography example, if the average density and total volume of a candidate is within the threshold set for the ileocecal valve then the candidate characteristics are considered to comprise those of an ileocecal valve, and appropriate action can be taken.

EXAMPLE 16

Exemplary Thresholds

Although particular thresholds are described for some of the examples (for example, less than −124 HU and volume greater than 1.5 cc), other thresholds can be used in different scenarios. For example, a region having the same density may result in different measurements in different systems or using data acquisition shemes.

Thresholds can be defined via standardized units (e.g., Hounsfield units). Thresholds can be chosen based on whether they indicate presence of the structure in question. Because the ileocecal valve has a high fat content, a threshold indicative of the fat content (e.g., high) of the ileocecal valve can be used in the case of the ileocecal valve. Thresholds can be expressed in percentages (e.g., percentage of fat content). Thresholds can also take into account the measurement process (e.g., volume averaging artifact may affect density or signal intensity measurements).

In the case of Hounsfield units, standardization can be defined so that water measures at 0 HU, pure fat measures at −100 HU, and ordinary tissue is at 20-60 HU. Due to partial volume averaging (e.g., averaging with air in lumen of the colon), measurements of fatty structures may sometimes be less than −100 HU (e.g., −124 HU). The measurements achieved via segmentation are quasi-measurements of the physical structure's actual density. In an ultrasound scenario, the ileocecal valve will exhibit hyperechogenicity (e.g., be hyperechoic) due to its high fat content.

Appropriate thresholds can be chosen to differentiate structures of interest (e.g., malignant, pre-malignant or possibly malignant) from benign ones. A threshold appropriate for differentiating can be determined via empirical observation. For example, given the graphs shown in FIGS. 5A and 5B, thresholds can be chosen to differentiate the ileocecal valve from other structures (e.g., polyps). For example, polyps warranting further investigation have a lower fat content.

EXAMPLE 17

Identification of Gas

A candidate polyp can be confirmed as an ileocecal valve via identification or location of a digital representation of gas in the terminal ileum (e.g., proximate the candidate polyp). The terminal ileum is the portion of the small bowl that leads into the ileocecal valve.

EXAMPLE 18

Overview of Presenting Results

Candidate polyps still categorized as candidate polyps can be provided in a number of ways. Additionally, candidate polyps reclassified as normal structures (for example, an ileocecal valve) can be provided in a number of ways. For example, the digital representations can be presented in a digital gallery of images. Color coding can be used to indicate which are still classified as polyps candidates and which are reclassified as normal structures.

In a fully automated system, the location or image of an anomaly of interest can be provided as a result. In a system with user (for example, physician) assistance, the polyp candidate can be presented to the user for confirmation or rejection of as being a polyp. Those polyp candidates confirmed as polyps can then be provided as a result.

EXAMPLE 19

Exemplary Application of Technologies

The technologies described herein can be included as part of a computer-aided detection ("CAD") system for analyzing virtual colons. By identifying the ileocecal valve, the technologies can make such a system more useful in that false positives are reduced.

For example, a segmenter can be employed to segment polyp candidates (for example, including the ileocecal valve). The technologies described herein can be used to classify the ileocecal valve as a false positive (for example, remove from the list of polyp candidates).

EXAMPLE 20

Exemplary Advantages of Technologies

In addition to the advantage of improving specificity of computer-aided detection of polyps, the technologies described herein can have other advantages. For example, if the ileocecal valve is routinely detected by a program, it becomes ineffective in identifying lesions on or near the ileocecal valve because the physician (for example, radiologist) may assume any detections in the cecum most likely represent a false positive on the ileocecal valve. The physician may thus ignore even true positives that have been detected by the software. Eliminating the ileocecal valve false positive thus results in greater physician attention to polyp candidates in the cecum.

EXAMPLE 21

Details of Exemplary Implementation: Detecting and Classifying Normal Structures from Candidate Anomalies Two datasets (Dataset "1" and Dataset "2") were used in an exemplary implementation of the technologies. The two datasets had CT colonography exams of 20 and 40 patients, respectively, that were interpreted by an automated CAD algorithm and compared to results from a conventional colonoscopy exam.

In the exemplary implementation, ileocecal valves were detected using a classifier (for example, comparer) trained on Dataset 2 (40 patients) that considered mean CT attenuation (a measurement of density) and volume of segmentable detections.

Dataset 1 consisted of 20 patients with known polyps discovered at barium enema or sigmoidoscopy. Dataset 2 consisted of 40 high risk asymptomatic patients, 20 of whom had at least one polyp 1 cm or larger on conventional colonoscopy performed the same day as the CT colonography and 20 consecutive patients having normal colonoscopy performed the same day. "High risk" indicates a family or personal history of colorectal cancer and therefore includes patients in a surveillance population. Patients in both sets had complete colonoscopy to the cecum.

Patients underwent a standard oral colonoscopy preparation (polyethylene glycol electrolyte solution [1 gallon administered orally; Colyte; Reed and Carnruick, Jersey City, N.J.] and bisacodyl tablets [two 5-mg tablets administered orally; Dulcolax; CIBA-Consumer, Edison, N.J.]) and $CO_2$ insufflation of the colon to patient tolerance. The patients in Dataset 2 and one patient in Dataset 1 received 1 mg glucagon administered subcutaneously 10 minutes prior to the examination.

CT scans were done on a HiSpeed Advantage (21 patients, Dataset 1 and one from Dataset 2), Lightspeed QX/i (36 patients, Dataset 2) or Lightspeed Plus (3 patients, Dataset 2) helical CT scanner (General Electric Medical Systems, Milwaukee, Wis.). CT scanning parameters were 120 kVp, 70 mAs (mean), 5 mm collimation, and 3 mm reconstruction interval (2 mm overlap). Patients were scanned both prone and supine. The supine scan was done first, followed by the prone scan. The size of the typical CT colonography dataset (supine or prone) was approximately 80 MB (160 images).

Conventional colonoscopy was performed following CT colonography on the same day. The colonoscopists were not aware of the results of the CT colonography examination. Polyp sizes were determined by the colonoscopist at the time of the examination using a probe or forceps for reference. For purposes of brevity, polyps >=1.0 cm and polyps <1.0 cm are hereinafter referred to as "large" and "small" polyps, respectively. Because the CAD system was trained to find mainly large polyps, small polyps are discussed no further in this example.

The location of each ileocecal valve was recorded in a data file. For both the supine and prone CT colonography studies, a single radiologist identified the ileocecal valve on axial CT colonography images by clicking on a voxel inside the ileocecal valve, approximately in its center (the precise voxel was not important, only that it be within the ileocecal valve). The ileocecal valve could readily be identified in the majority of cases by identifying the terminal ileum and tracing it to its communication with the cecum.

The data file of voxels, one per ileocecal valve per CT colonography examination, was passed to a polyp segmenter. The segmenter identified the edges of candidates by an iterative process consisting of a knowledge-based deformable contour and fuzzy clustering. The segmenter reports the total volume of an object (for example, in cc's) and its interior density (for example, in HU). The interior density is the average density of voxels within the segmented region not on the region's boundary.

The number of ileocecal valves that could be analyzed by the segmenter and the number of ileocecal valves that the segmenter determined were unlikely to represent polyps were recorded. Detections that the segmenter could not segment were eliminated. In the example, there are several criteria useful for an ileocecal valve detection to be segmentable. First the boundary between the ileocecal valve region and lumen are convex (at least ¼ of boundary pixels has curvature smaller than $-0.5 \text{ cm}^{-1}$); second, the ileocecal valve region is at least a minimum size (>8 pixels); third, the region is not flat (width/height ratio <3.5). These criteria are derived from the polyp segmentation algorithm. Those ileocecal valves that cannot be segmented are not likely to be detected as false positive polyps.

The results were recorded in two ways. First, known ileocecal valves were analyzed to determine how many of them could be eliminated, and at which stage in the analysis. Second, a CAD algorithm was used to determine how many of the false positive CAD marks were on an ileocecal valve, and how many of these could be eliminated. The CAD algorithm is discussed below.

The rationale of the ileocecal valve recognition algorithm is the clinical observation that ileocecal valves are both large and low in density. There is little information in the literature about the imaging characteristics of the normal ileocecal valve at CT. The ileocecal valve will often contain fat within it, also known as "lipomatous infiltration." Unfortunately, the barium enema radiograph will not provide data as to the internal composition of the ileocecal valve. The majority of segmentable ileocecal valves (51 of 80, 64%) were relatively low in internal density, compatible with fat.

On the basis of this observation, thresholds were set for average density within a segmented object (<-124 HU) and total volume (>1.5 cc). In the example, the segmented object (for example, a digital representation of at least a portion of the colon) must meet both of these thresholds to be considered an ileocecal valve. These thresholds were chosen manually from Dataset 2 data so that no TP's were lost and applied to Dataset 1.

The CT images were transferred to a personal computer (Dell Precision 620 Workstation, Austin, Tex.) and the images were analyzed using a computer-aided polyp detection software package. In brief, voxels along the wall of the colon are identified, and the shape and CT attenuation of the wall is measured to classify the wall locally into polypoid and non-polypoid areas. The software analyzed CT colonography studies at the rate of one every two minutes (four minutes total for supine and prone CT colonography studies).

The polyp detection software used surface-based filtering criteria. The particular settings for the polyp detector in the example were chosen based upon their relatively high sensitivity and low number of false positives per colon. The specifications for the detector are elliptical curvature of the peak subtype, mean curvature range $-2.5$ to $-0.7 \text{ cm}^{-1}$, $\geq 28$ vertices, $\geq 0.25$ cm diameter, and sphericity $\leq 1.2$, density within a region inside the polyp between $-324$ and $976$ HU, minimum segmented polyp volume 0.1 cc, minimum wall thickness 1 mm, minimum polyp surface area 0.015 sq. cm (curvature is a measure of shape; elliptical curvature is a polypoid shape; vertices and diameter are measures of size; and sphericity is a measure of roundness).

In the example, a support vector machine ("SVM") classifier was used as part of the CAD algorithm. A genetic algorithm selected the best features for input into the SVM. Then, a series of SVM's, each using a different combination of features, was run on the output of the filter. If a number of SVM's greater than a threshold determine the detection to represent a polyp, then a positive detection (for example, a polyp candidate) is output by the classifier. This classifier was trained on a third larger dataset that included Dataset 1 and was similar to it in terms of method of data acquisition and criteria for patient inclusion.

A polyp was considered to be "detected" by the computer algorithm when the center of a computer-detected polyp was within one voxel of a manually drawn contour of a polyp recorded in the database, thereby matching a polyp on the colonoscopy report. Perspective volume-rendered endoluminal views of the polyps were generated by software.

P values ≦0.05 were considered significant. The Fisher exact test was used to compare sensitivities for unmatched data. Confidence intervals for proportions were computed from the binomial distribution.

Figure 5A:
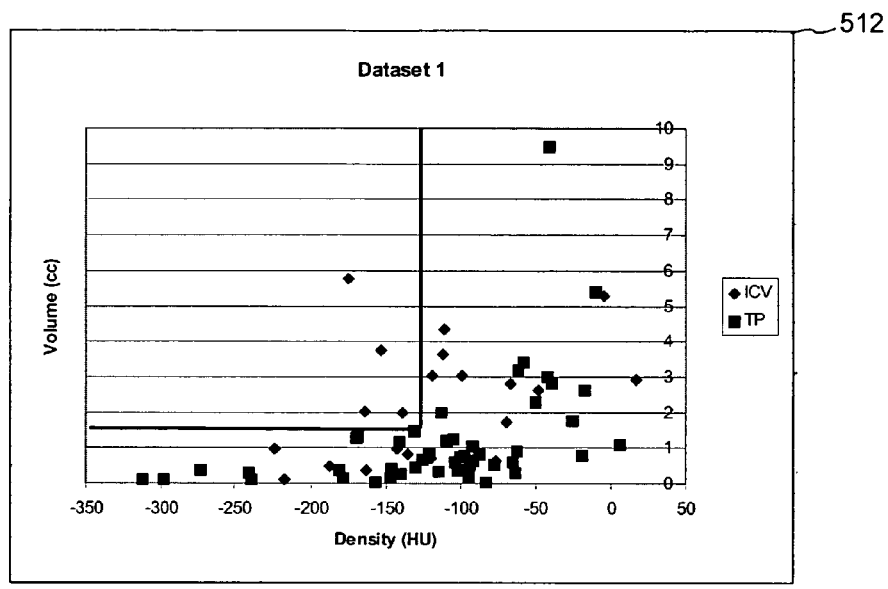
FIGS. 5A-B are charts showing plots of characteristics for two datasets derived via colon CT Scans.
Figure 5B:
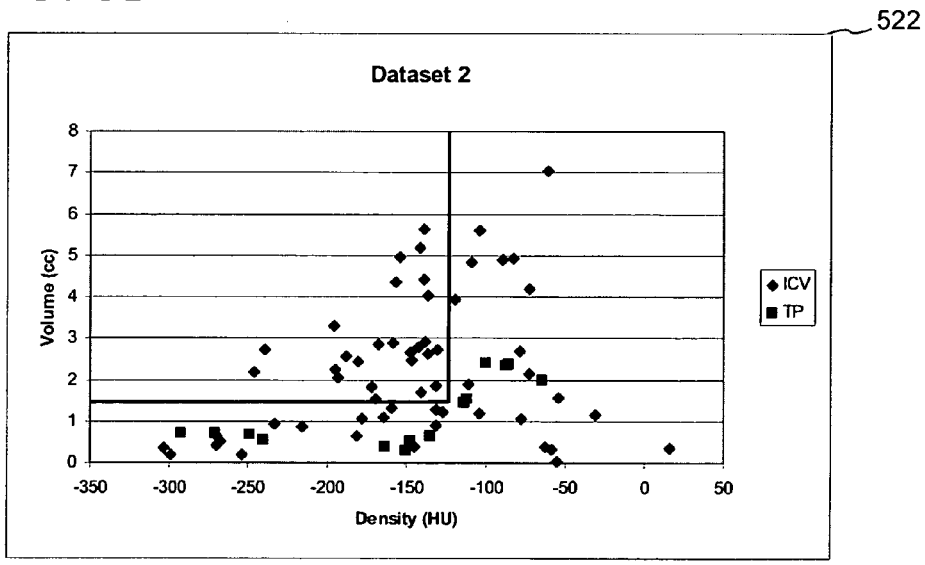

FIGS. 5A and B are charts showing average CT density versus volume for true polyps (TP-squares) and ileocecal valves (ICV-diamonds) for the patients. FIG. 5A shows the plot of Dataset 1 at 512. FIG. 5B shows the plot of Dataset 2 at 522.

For Dataset 2 522, the 14 true polyps shown represent 9 unique large polyps found by computer-aided detection ("CAD"). The 5 additional true polyps represent additional detections on large polyps and/or detections on both the supine and prone CT colonography exams.

For Dataset 1 512, the 48 true polyps shown represent 21 unique large polyps found by CAD. The 27 additional true polyps represent additional detections on large polyps and/or detections on both the supine and prone CT colonography exams.

The ileocecal valves are those in the dataset, without regard to whether they were reported by CAD, that were both manually identifiable and segmentable by a deformable contour segmentation algorithm. Note that the true polyps tend to have relatively low density that is attributable to the partial volume effect. The thick lines in the plots show the cutoffs for average density (<−124 HU) and size (Volume >1.5 cc) that were found to be optimal for detecting the ileocecal valve in this patient set. Detections that fall in the left upper quadrant of the plot (low density and large volume) are consistent with ileocecal valves and are rejected from the list of polyp candidates reported by CAD.

The numbers of large polyps retrospectively identifiable were 26 and 18 for Datasets 1 and 2, respectively. The CAD algorithm found 21 and 9 of these large polyps, yielding sensitivities of 81% and 50%, respectively. There were on average 4.6 and 2.0 false positives per patient, respectively.

For Dataset 2, 70 ileocecal valves could be located manually on the 80 CT colonography examinations (88%). Of the 70 ileocecal valves, the segmenter eliminated 11 that were not segmentable (16%). Ileocecal valves that were not segmentable did not undergo further processing and were not reported as a false positive polyp detection.

Of the 59 segmentable ileocecal valves, 41 (69%) were low in density (<−124 HU) and 36 (61%) were large (>1.5 cc). Of these 59 segmentable ileocecal valves, 25 (42%) of the ileocecal valves could be eliminated by the ileocecal valve detector as shown in the chart 522. Therefore, the total elimination rate was 51% (36/70). The average density and volume of the ileocecal valve was −147 HU (st. dev. 58 HU) and 2.3 cc (st. dev. 1.3 cc), respectively. No true positive polyp detections were eliminated. Note that in FIG. 5A, the true positive detections tend to have relatively low internal density (<0 HU). This is due to the relatively large partial volume effect that occurs at the edge of polyps.

Regarding false positive elimination, there were 78 false positive detections, of which 18 were on an ileocecal valve (23%). Of these 18 false positives, the ileocecal valve detection algorithm eliminated 11 (61%) (95% confidence interval, 36% to 83%). The 7 false positives that were not rejected were on 7 ileocecal valves, and were due to one or more of these causes: failed segmentation, ileocecal valve volume too small, or CT attenuation of ileocecal valve too dense.

For Dataset 1, 34 ileocecal valves could be located manually on the 40 CT colonography examinations (85%). Of the 34 ileocecal valves, the segmenter could eliminate 13 (38%). Of the 21 (62%) segmentable ileocecal valves, 10 (48%) were low in density (<−124 HU) and 13 (62%) were large (>1.5 cc). Of these 21, the ileocecal valve detection algorithm could further eliminate 4 (19%), for a total elimination rate of 50% (17/34).

Using identical parameters to those used for Dataset 2 data, CAD reported 91 false positive detections for Dataset 1 data (about 4 per patient) of which 9 (10%) were attributable to the ileocecal valve. The proposed method eliminated 3 (33%) of the false positive detections attributable to the ileocecal valve (95% confidence interval, 8% to 70%), and none of the true positive detections. The 6 false positives that were not rejected were on 4 ileocecal valves, in 2 cases because the ileocecal valve was not fatty enough, in one because the segmentation failed to detect the entire ileocecal valve, and in one because the segmentation mistakenly included part of the terminal ileum.

The reclassifier produces a benefit by reducing the number of false positives from CAD (a reduction of 33% for Dataset 1 and 61% for Dataset 2). The performance of the ileocecal valve detector on manually detected ileocecal valves and on false positives was not significantly different between Dataset 1 and Dataset 2 (p=0.64 and 0.34, respectively).

The ileocecal valve detector found ileocecal valves well in both patient datasets, despite the differences in scan acquisition (single versus multi-detector), preparation (glucagon versus no glucagon) and indication (known polyps versus surveillance population). This result indicates that the appearance of the ileocecal valve was unaffected by these distinctions to any great extent and that the algorithm is relatively robust. Since the ileocecal valve detector was trained on Dataset 2 and tested on Dataset 1, it is not surprising that its sensitivity was greater for Dataset 2, both with and without CAD, although the differences were not statistically significant. The lack of a statistically significant difference on the false positives from CAD (p=0.34) may also be attributable in part to the relatively small sample size.

A 5 mm collimation with 2 mm overlap was used. It was observed that polyps have higher density if the collimation is thinner, because the partial volume effect is reduced. If thinner collimation is used, the thresholds will likely need to be readjusted. The effect of slice thickness on accuracy of ileocecal valve density measurement will need to be determined.

Results were not reported for polyps less than 1 cm because the CAD system was not trained to identify them. Polyps smaller than 1 cm were also more difficult to see in retrospect. Thinner collimation may allow training a CAD system to detect smaller polyps. Nevertheless, because the ileocecal valve detector was trained to recognize structures having volumes larger than 1.5 cc, it is unlikely that small polyps would be inappropriately excluded by the detector.

The ileocecal valve detector can eliminate many lipomas as well. While lipomas are abnormal growths, they have no malignant potential and thus it is much less important that they be detected in CT colonography.

In the example, location information was not used to process true polyps and false positives according to whether they were located in the cecum. It was assumed that polyps elsewhere in the colon were similar in CT appearance to those in the cecum and, so other polyps were used as surrogates for cecal polyps that must be distinguished from the ileocecal valve.

There is some evidence that right-sided colonic polyps have different genetics compared to polyps elsewhere in the colon. Whether they have different shape or CT attenuation is as yet unknown. Location information can be used if it improves the performance of the ileocecal valve detector. In clinical practice, the ileocecal valve detector can be configured to only classify a false positive as the ileocecal valve if the detection is located in the cecum.

EXAMPLE 22

Details of Exemplary Implementation: Classifier

As described above, the classifier can be chosen from a variety of architectures and include any combination of the described characteristics. The classifier can be a stand-alone classifier or built into an initial surface-based classifier. For example, a classifier can be built as a neural network and trained on the volume, density, CT attenuation, and MRI intensity. After training, the neural network can be tested and then deployed for use.

EXAMPLE 23

Exemplary Distinctive Depiction of Normal Structure

Screen shots of views of exemplary graphical depictions of candidate polyps initially detected and reclassified as a normal structure (i.e., the ileocecal valve) are shown in FIGS. 6-9. The screen shots include views in which the normal structure is distinctively depicted.

Figure 6A:
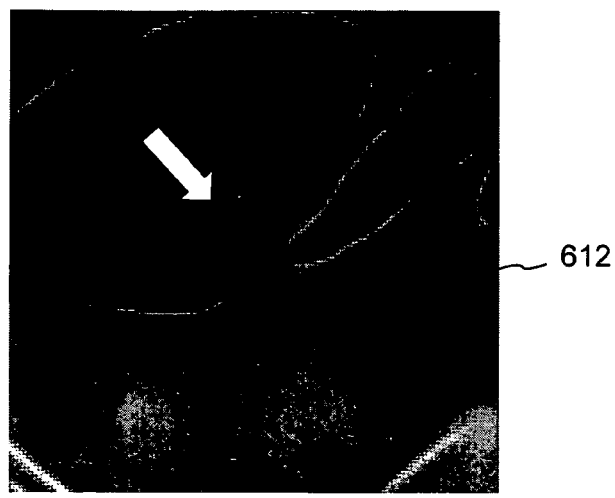
FIGS. 6A-C are screen shots of views of the ileocecal valve of a first subject, including screen shots in which the ileocecal valve is distinctively depicted.
Figure 6B:
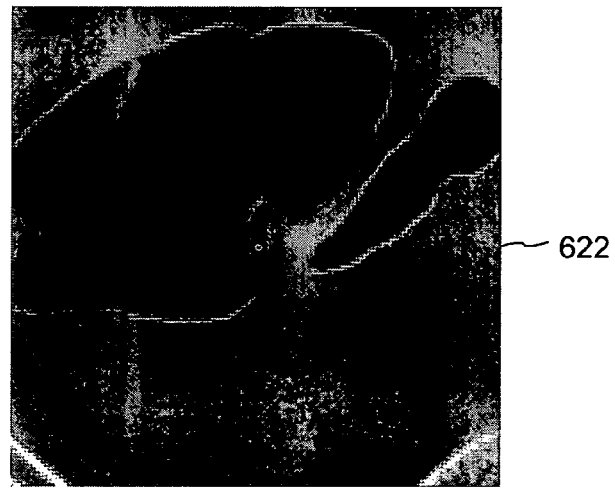
Figure 6C:

In the views shown in FIGS. 6A-C, the digital representation (for example, polyp candidate) is the ileocecal valve of a 51 year old male. FIGS. 6A and 6C show user interfaces that can be used in conjunction with any of the technologies described herein to distinctively depict the ileocecal valve. The depiction 612 includes an arrow pointing to the anomaly of interest. The views are of transaxial CT colonography images (supine) using soft tissue 612, and lung window settings 622 and 632. The partial fat content is evident in 612. At 632, the CT colonography image shows the computer-generated boundary of the ileocecal valve. For this candidate, the average density was determined to be −131 HU and the volume 2.7 cc. Density measurements reflect the average density within the boundary and are taken in three dimensions, not just as the image shown.

Figure 7A:
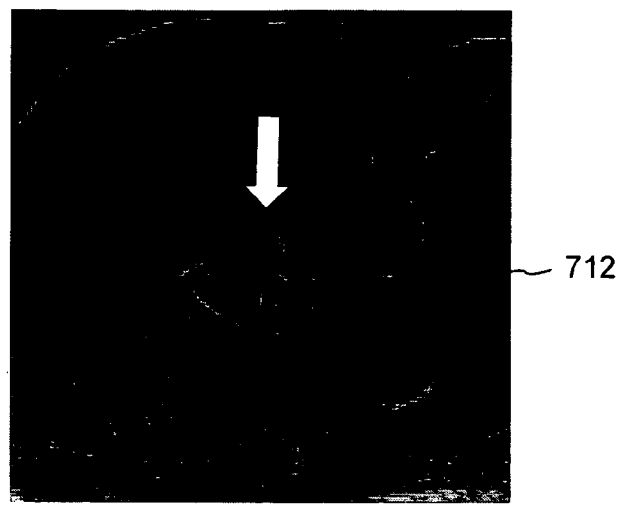
FIGS. 7A-C are screen shots of views of the ileocecal valve of a second subject, including screen shots in which the ileocecal valve is distinctively depicted.
Figure 7B:
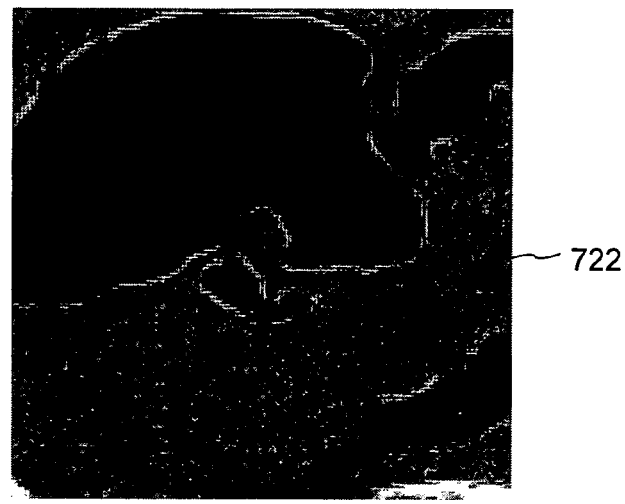
Figure 7C:

In the screenshots of views shown in FIGS. 7A-C, the digital representation (for example, polyp candidate) is the ileocecal valve of a 51 year old female. FIGS. 7A and 7C show user interfaces that can be used in conjunction with any of the technologies described herein to distinctively depict the ileocecal valve. The depiction 712 includes an arrow pointing to the anomaly of interest. The views are of transaxial CT colonography images (supine) using soft tissue 712, and lung window settings 722 and 732. At 732, the CT colonography image shows the computer-generated boundary of the ileocecal valve. For this candidate, the average density was determined to be −147 HU and the volume 2.5 cc. Density measurements reflect the average density within the boundary and are taken in three dimensions, not just as the image shown.

Figure 8A:
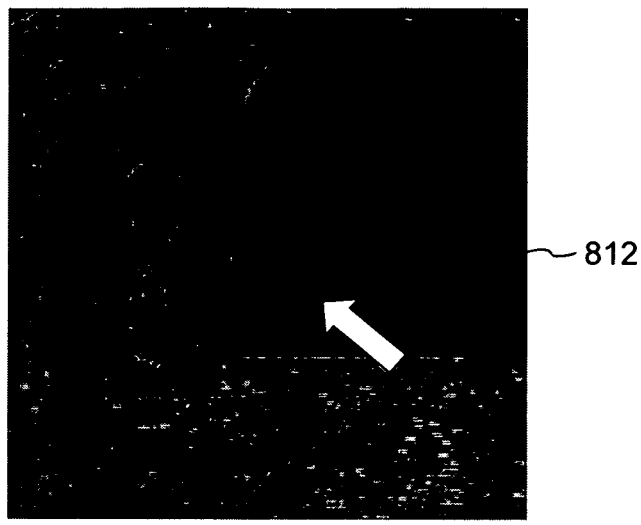
FIGS. 8A-C are screen shots of views of the ileocecal valve of a third subject, including screen shots in which the ileocecal valve is distinctively depicted.
Figure 8B:
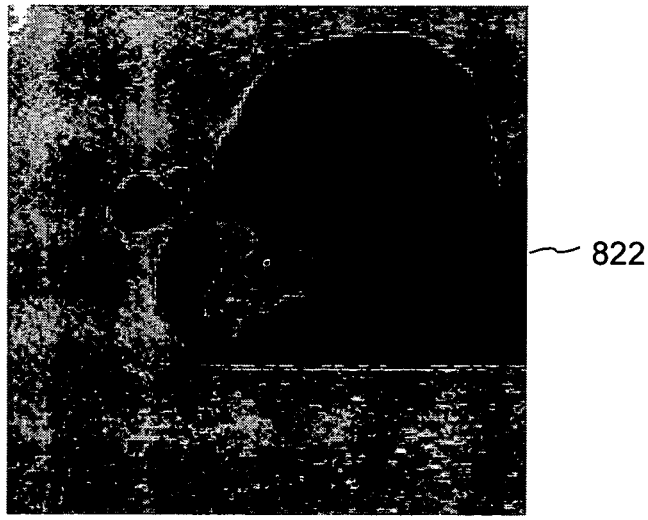
Figure 8C:
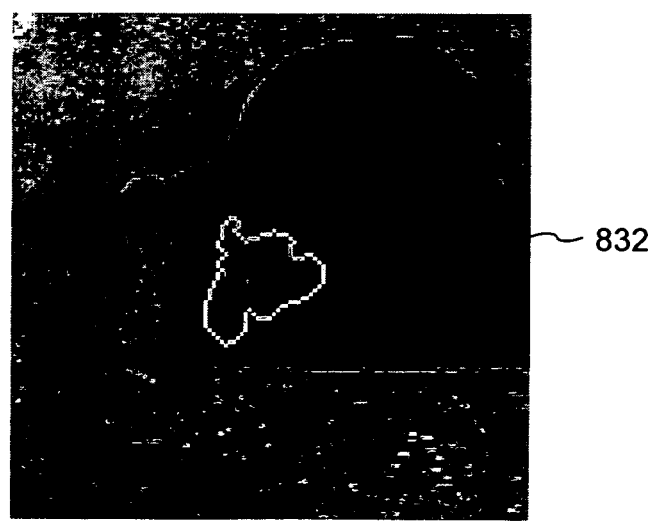

In the views shown in FIGS. 8A-C, the digital representation (for example, polyp candidate) is the ileocecal valve of a 59 year old male. FIGS. 8A and 8C show user interfaces that can be used in conjunction with any of the technologies described herein to distinctively depict the ileocecal valve. The depiction 812 includes an arrow pointing to the anomaly of interest. The views are of transaxial CT colonography images (supine) using soft tissue 812, and lung window settings 822 and 832. At 832, the CT colonography image shows the computer-generated boundary of the ileocecal valve. For this candidate, the average density was determined to be −155 HU and the volume 5.0 cc. Density measurements reflect the average density within the boundary and are taken in three dimensions, not just as the image shown.

Figure 9A:
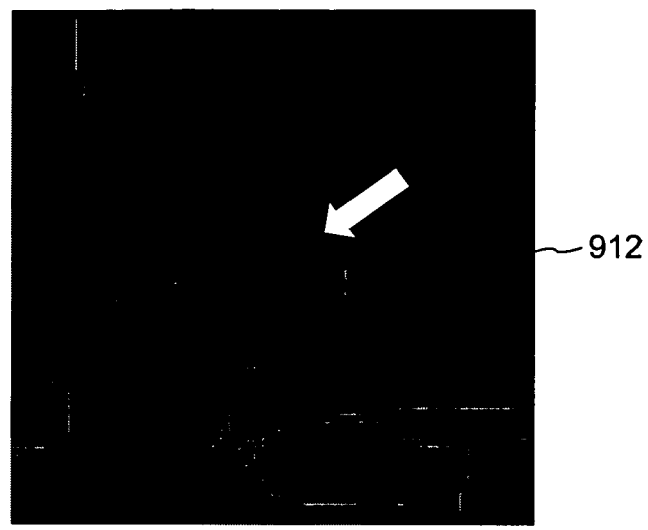
FIGS. 9A-C are screen shots of views of the ileocecal valve of a fourth subject, including screen shots in which the ileocecal valve is distinctively depicted.
Figure 9B:
Figure 9C:

In the views shown in FIGS. 9A-C, the digital representation (for example, polyp candidate) is the ileocecal valve of a 61 year old female. FIGS. 9A and 9C show user interfaces that can be used in conjunction with any of the technologies described herein to distinctively depict the ileocecal valve. The depiction 912 includes an arrow pointing to the anomaly of interest. The views are of transaxial CT colonography images (supine) using soft tissue 912, and lung window settings 922 and 932. At 932, the CT colonography image shows the computer-generated boundary of the ileocecal valve. For this candidate, the average density was determined to be −140 HU and the volume 2.0 cc. Density measurements reflect the average density within the boundary and are taken in three dimensions, not just as the image shown.

In the user interfaces shown herein, colored areas (for example, regions) can be used to assist in detection of true polyps and normal structures (for example, ileocecal valve). For example, a different color can be used for normal structures.

EXAMPLE 24

Exemplary Computer System for Conducting Analysis

Figure 10:
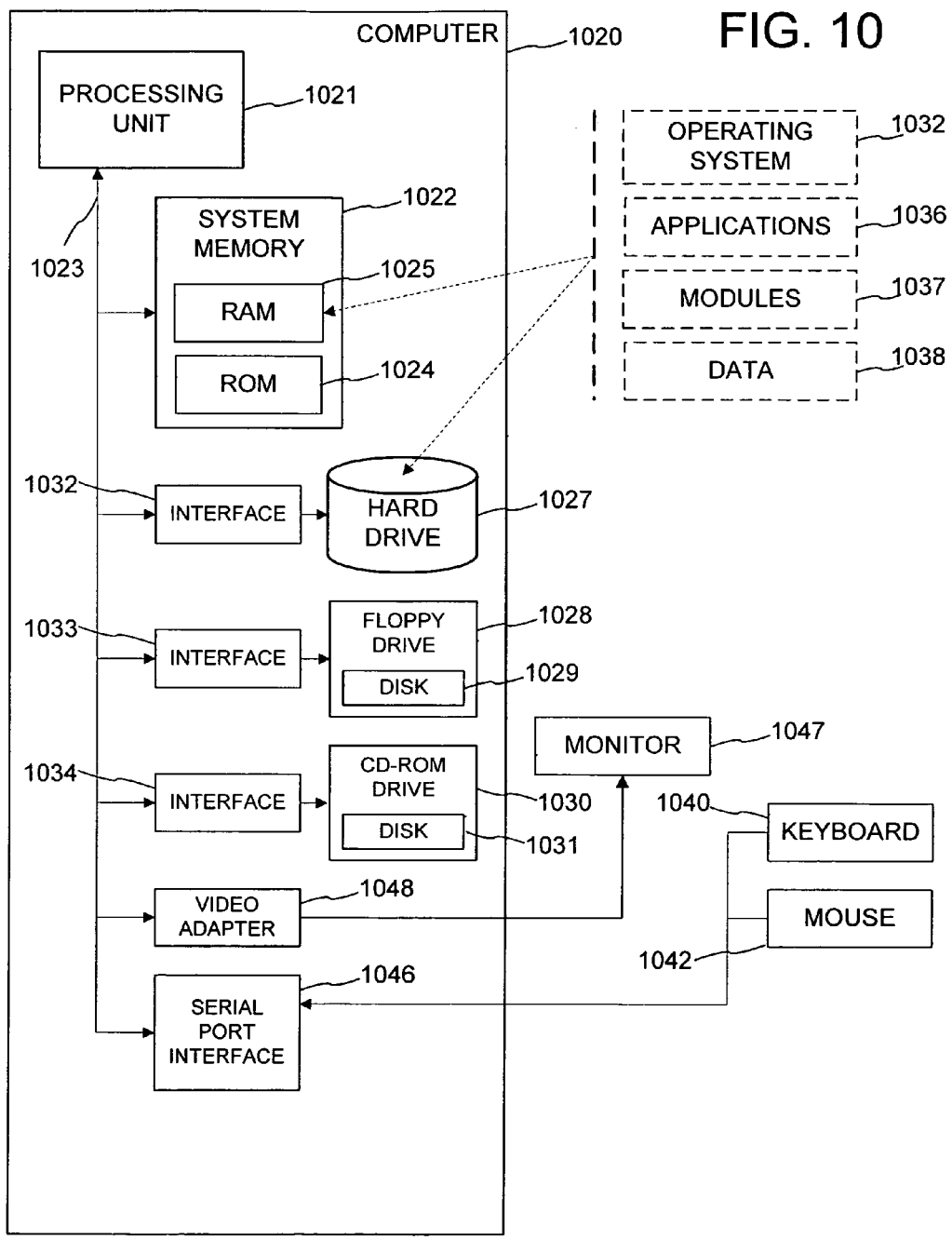
FIG. 10 is a block diagram of an exemplary computer system for implementing the described technologies.

FIG. 10 and the following discussion provide a brief, general description of a suitable computing environment for the software (for example, computer programs) described above. The methods described above can be implemented in computer-executable instructions organized in program modules. The program modules can include the routines, programs, objects, components, and data structures that perform the tasks and implement the data types for implementing the techniques described above.

While FIG. 10 shows a typical configuration of a desktop computer, the technologies may be implemented in other computer system configurations, including multiprocessor systems, microprocessor-based or programmable consumer electronics, minicomputers, mainframe computers, and the like. The technologies may also be used in distributed computing environments where tasks are performed in parallel by processing devices to enhance performance. For example, tasks related to measuring characteristics of candidate anomalies can be performed simultaneously on multiple computers, multiple processors in a single computer, or both. In a distributed computing environment, program modules may be located in both local and remote memory storage devices.

The computer system shown in FIG. 10 is suitable for implementing the technologies described herein and includes a computer 1020, with a processing unit 1021, a system memory 1022, and a system bus 1023 that interconnects various system components, including the system memory to the processing unit 1021. The system bus may comprise any of several types of bus structures including a memory bus or memory controller, a peripheral bus, and a local bus using a bus architecture. The system memory includes read only memory (ROM) 1024 and random access memory (RAM) 1025. A nonvolatile system (for example, BIOS) can be stored in ROM 1024 and contains the basic routines for transferring information between elements within the personal computer 1020, such as during start-up. The personal computer 1020 can further include a hard disk drive 1027, a magnetic disk drive 1028, for example, to read from or write to a removable disk 1029, and an optical disk drive 1030, for example, for reading a CD-ROM disk 1031 or to read from or write to other optical media. The hard disk drive 1027, magnetic disk drive 1028, and optical disk 1030 are connected to the system bus 1023 by a hard disk drive interface 1032, a magnetic disk drive interface 1033, and an optical drive interface 1034, respectively. The drives and their associated computer-readable media provide nonvolatile storage of data, data structures, computer-executable instructions (including program code such as dynamic link libraries and executable files), and the like for the personal computer 1020. Although the description of computer-readable media above refers to a hard disk, a removable magnetic disk, and a CD, it can also include other types of media that are readable by a computer, such as magnetic cassettes, flash memory cards, digital video disks, and the like.

A number of program modules may be stored in the drives and RAM 1025, including an operating system 1035, one or more application programs 1036, other program modules 1037, and program data 1038. A user may enter commands and information into the personal computer 1020 through a keyboard 1040 and pointing device, such as a mouse 1042. Other input devices (not shown) may include a microphone, joystick, game pad, satellite dish, scanner, or the like. These and other input devices are often connected to the processing unit 1021 through a serial port interface 1046 that is coupled to the system bus, but may be connected by other interfaces, such as a parallel port, game port, or a universal serial bus (USB). A monitor 1047 or other type of display device is also connected to the system bus 1023 via an interface, such as a display controller or video adapter 1048. In addition to the monitor, personal computers typically include other peripheral output devices (not shown), such as speakers and printers.

The above computer system is provided merely as an example. The technologies can be implemented in a wide variety of other configurations. Further, a wide variety of approaches for collecting and analyzing data related to processing candidate anomalies is possible. For example, the data can be collected, characteristics determined and measured, anomalies classified and reclassified, and the results presented on different computer systems as appropriate. In addition, various software aspects can be implemented in hardware, and vice versa.

EXAMPLE 25

Exemplary Methods

Any of the methods described herein can be performed by software executed by software in an automated system (for example, a computer system). Fully-automatic (for example, without human intervention) or semi-automatic operation (for example, computer processing assisted by human intervention) can be supported. User intervention may be desired in some cases, such as to adjust parameters or consider results.

Such software can be stored on one or more computer-readable media comprising computer-executable instructions for performing the described actions.

ALTERNATIVES

Having illustrated and described the principles of the invention in exemplary embodiments, it should be apparent to those skilled in the art that the described examples are illustrative embodiments and can be modified in arrangement and detail without departing from such principles.

Although some of the examples describe colonography and detecting polyps and normal structures in a virtual colon, the technologies can be applied to other anatomical structures as well. For example implementations can be applied to the bronchus, blood vessels, bladder, urinary tract, billiary tract, cerebrospinal spinal fluid containing spaces of the brain, paranasal sinuses, chambers of the heart, and the like.

In view of the many possible embodiments to which the principles of the invention may be applied, it should be understood that the illustrative embodiments are intended to teach these principles and are not intended to be a limitation on the scope of the invention. We therefore claim as our invention all that comes within the scope and spirit of the following claims and their equivalents.

We claim:

1. A computer-implemented method of processing a digital representation of at least a portion of a colon, the method comprising:
    receiving one or more characteristics of the digital representation of at least a portion of a colon;
    in software, determining whether the characteristics of the digital representation comprise characteristics of an ileocecal valve; and
    based on said determining whether the characteristics of the digital representation comprise characteristics of an ileocecal valve, taking an action with respect to the digital representation.

2. A computer-readable medium comprising computer-executable instructions for performing a method of processing a digital representation of at least a portion of a colon, the method comprising:
    receiving one or more characteristics of the digital representation of at least a portion of a colon;
    in software, determining whether the characteristics of the digital representation comprise characteristics of an ileocecal valve; and
    based on said determining whether the characteristics of the digital representation comprise characteristics of an ileocecal valve, taking an action with respect to the digital representation.

3. The method of claim 1 wherein the digital representation is acquired via imaging.

4. The method of claim 1 wherein the digital representation is acquired via Computed Tomography Imaging technology.

5. The method of claim 1 wherein the digital representation is acquired via MRI technology.

6. The method of claim 1 wherein the digital representation is acquired via ultrasound technology.

7. The computer-implemented method of claim 1 wherein boundaries of the digital representation are determined via a segmentation technique.

8. The computer-implemented method of claim 1 wherein the receiving takes place after having classified the digital representation as a polyp candidate with a software classifier.

9. The computer-implemented method of claim 8 wherein the action comprises declassifying the digital representation as a polyp candidate.

10. The method of claim 8 wherein the polyp candidates are discovered via surface based filters measuring regions in the digital representation.

11. The method of claim 10 wherein the surface-based filtering criteria detects polyps based on at least the following criteria:
    elliptical curvature subtype;
    curvature range;
    number of vertices;
    diameter; and
    sphericity.

12. The method of claim 8 wherein the polyp candidates are discovered via segmentation.

13. The method of claim 8 wherein boundaries of polyp candidates are discovered via segmentation.

14. The method of claim 13 wherein the segmentation is operable to segment a structure of the digital representation having the following characteristics:
    a boundary between the structure and a lumen of the colon is convex;
    the structure is of at least a minimum size; and
    the structure is not flat.

15. The computer-implemented method of claim 1 wherein the action comprises removing the digital representation from a list of polyp candidates.

16. The computer-implemented method of claim 1 wherein the action comprises distinctively depicting the digital representation in a visual depiction thereof.

17. The computer-implemented method of claim 1 wherein the characteristics of the ileocecal valve comprise volume.

18. The method of claim 17 wherein volume of the digital representation is determined via an interior of boundaries of the digital representation.

19. The computer-implemented method of claim 1 wherein the characteristics of the ileocecal valve comprise density.

20. The computer-implemented method of claim 19 wherein the characteristics of the ileocecal valve further comprise volume.

21. The method of claim 19 wherein density of the digital representation is determined via an entire segmented area of the digital representation.

22. The method of claim 19 wherein density of the digital representation is determined via an interior of boundaries of the digital representation.

23. The method of claim 19 wherein density of the digital representation is determined via an average of an entire segmented area of the digital representation.

24. The method of claim 19 wherein density of the digital representation is determined by attenuation of the digital representation.

25. The method of claim 24 wherein the attenuation of the digital representation is determined via an interior of boundaries of the digital representation.

26. The method of claim 24 wherein the attenuation of the digital representation is determined via an average of an entire segmented area of the digital representation.

27. The computer-implemented method of claim 1 wherein the characteristics of the ileocecal valve comprise location within the colon.

28. The computer-implemented method of claim 1 wherein the characteristics of the ileocecal valve comprise intensity.

29. The computer-implemented method of claim 1 wherein the characteristics of the ileocecal valve comprise attenuation.

30. The computer-implemented method of claim 1 wherein the digital representation represents a lipoma.

31. The computer-implemented method of claim 1 wherein the digital representation represents an ileocecal valve.

32. The computer-implemented method of claim 1 further comprising:
    confirming the digital representation represents an ileocecal valve by identifying a digital representation of gas proximate to the digital representation.

33. A computer-implemented method of processing a digital representation of a portion of an anatomical structure, the method comprising:
    out of a set of digital representations of a plurality of portions of the anatomical structure, identifying one digital representation out of the digital representations as a normal structure in software, wherein the set of digital representations is a product of a software classifier identifying the set of digital representations as polyp candidates within a digital representation of the anatomical structure, wherein identifying the one digital representation is based on at least density and volume associated with the digital representation; and
    responsive to identifying the one digital representation as a normal structure, designating the one digital representation as not being a polyp candidate;
    wherein:
    the anatomical structure comprises a colon; and
    the normal structure comprises an ileocecal valve.

34. A computer-based classifier for processing a digital representation of at least a portion of a colon, the classifier comprising:
    stored ileocecal valve characteristics, the stored characteristics representing paradigmatic characteristics of digital representations of ileocecal valves; and
    a comparer operable to compare the stored ileocecal valve characteristics with those of the digital representation of at least a portion of a colon, the comparer further operable to indicate whether the digital representation has the characteristics.

35. The classifier of claim 34 wherein the classifier is further operable to remove the portion from a list of polyp candidates when the portion meets the thresholds.

36. The classifier of claim 34 wherein the classifier is further operable to identify a lipoma.

37. The classifier of claim 34 wherein:
    the classifier is part of a computer-aided detection system for locating polyps within the colon; and
    the classifier performs segmentation, including segmentation of the digital representation;
    wherein the digital representation represents an ileocecal valve.

38. A computer-based classifier for processing a digital representation of at least a portion of a colon, the classifier comprising:

means for storing stored ileocecal valve characteristics, the stored characteristics representing paradigmatic characteristics of digital representations of ileocecal valves; and means for comparing the stored ileocecal valve characteristics with those of the digital representation of at least a portion of a colon, the means for comparing further operable to indicate whether the digital representation has the characteristics of an ileocecal valve.

39. A computer-implemented method of depicting a virtual anatomical structure, the method comprising:

receiving a virtual colon;

in software comprising a comparer configured to compare one or more ileocecal valve characteristics with characteristics of at least a portion of the virtual colon, processing the virtual colon to detect an ileocecal valve; and presenting the ileocecal valve distinctively in a presentation of at least a portion of the virtual colon.

40. A computer-generated user interface for presenting a graphical representation of an anatomical structure, the user interface comprising:

a depiction of the anatomical structure;

wherein a region of the anatomical structure detected as an ileocecal valve by software is depicted distinctively after detection by software comprising a comparer configured to compare one or more ileocecal valve characteristics with characteristics of the region of the anatomical structure.

41. The computer-generated user interface of claim 40 wherein the region is depicted with a distinctive color.

* * * * *

UNITED STATES PATENT AND TRADEMARK OFFICE
CERTIFICATE OF CORRECTION

PATENT NO.         : 7,440,601 B1                                    Page 1 of 1
APPLICATION NO. : 10/961681
DATED              : October 21, 2008
INVENTOR(S)        : Summers et al.

It is certified that error appears in the above-identified patent and that said Letters Patent is hereby corrected as shown below:

On the Cover - Inventors

Page 1, Column 1, line 5, "Rochester, MD" should read --Rochester, MN--

On the Cover - Other Publications

Page 1, Column 2, line 15, "Hounsfield=unit" should read --Hounsfield+unit--
Page 1, Column 2, line 15, "webiste" should read --website--
Page 2, Column 1, line 11, "polys" should read --polyps--
Page 2, Column 1, line 43, "polys" should read --polyps--
Page 2, Column 2, line 37, "Diganosis" should read --Diagnosis--
Page 3, Column 1, line 1, "Diganosis" should read --Diagnosis--

In the Specification

Column 2, line 7, "(QVC)" should read --(ICV)--
Column 6, line 59, "2003, describes" should read --2003, ("Summers I"), describes--
Column 7, lines 4-5, "can also performed" should read --can also be performed--
Column 7, line 10, "Iordenescu" should read --Iordanescu--
Column 9, line 46, "shemes." should read --schemes.--
Column 10, line 17, "bowl" should read --bowel--
Column 12, lines 65-66, "$\geq 28$ vertices" should read --$\geq$ 8 vertices--

In the Claims

Column 20, line 54, "meets the thresholds" should read --meets thresholds--

Signed and Sealed this

Eighteenth Day of May, 2010

David J. Kappos
*Director of the United States Patent and Trademark Office*